United States Patent [19]
Johnson et al.

[11] Patent Number: 5,442,482
[45] Date of Patent: Aug. 15, 1995

[54] MICROLENS SCREENS, PHOTOPOLYMERISABLE MATERIALS AND ARTIFACTS UTILISING THE SAME

[76] Inventors: William N. H. Johnson, 41 Courtenay Place, Lymington, Hants SO4 9NQ; Nicholas J. Phillips, 85 Byron Street, Loughborough, Leicestershire, LE11 0JN, both of England

[21] Appl. No.: 958,329
[22] PCT Filed: May 21, 1991
[86] PCT No.: PCT/GB91/00795
 § 371 Date: Dec. 18, 1992
 § 102(e) Date: Dec. 18, 1992
[87] PCT Pub. No.: WO91/18304
 PCT Pub. Date: Nov. 28, 1991

[30] Foreign Application Priority Data

| May 21, 1991 | [GB] | United Kingdom | 9011293 |
| May 21, 1990 | [GB] | United Kingdom | 9011294 |
| May 21, 1990 | [GB] | United Kingdom | 9011295 |
| May 21, 1990 | [GB] | United Kingdom | 9011296 |
| May 21, 1990 | [GB] | United Kingdom | 9011297 |
| May 21, 1990 | [GB] | United Kingdom | 9011298 |
| May 21, 1990 | [GB] | United Kingdom | 9011299 |
| May 21, 1990 | [GB] | United Kingdom | 9011300 |
| May 21, 1990 | [GB] | United Kingdom | 9011302 |

[51] Int. Cl.⁶ .......................... G02B 1/12; G02B 5/13; G02B 27/12
[52] U.S. Cl. .................................. 359/619; 359/620; 359/652
[58] Field of Search ........ 359/654, 652, 463, 618–624, 359/599; 264/2.6, 2.7; 430/4

[56] References Cited

U.S. PATENT DOCUMENTS

| 4,026,634 | 5/1977 | Fukushima . | |
| 4,114,983 | 9/1978 | Maffit et al. | 359/599 |
| 4,298,246 | 11/1981 | Iwamura . | |
| 4,399,455 | 8/1983 | Alvarez . | |
| 4,871,418 | 10/1989 | Wittlinger et al. . | |

FOREIGN PATENT DOCUMENTS

| 0294122 | 7/1988 | European Pat. Off. . | |
| 750155 | 1/1933 | France . | |
| 2309893 | 4/1976 | France . | |
| WO8702146 | 4/1987 | Japan | 359/652 |
| 284107 | 11/1990 | Japan | 359/652 |

OTHER PUBLICATIONS

International Search Report PCT/GB91/00795 European Search Report EP 88 30 4863.
"Light Diffuser With Controlled Divergence", 700 I.B.M. Technical Disclosure Bulletin 29 (1986), Jun. No. 1.
M. J. Jeudy and J. J. Robillard, "Spectral Photosensitization Of A Variable Index Material For Recording Phase Holograms With High Efficiency", Optics Communications, vol. 13, No. 1 (Jan. 1975).
Eugene Hecht and Alfred Zajac, "OPTICS", Addison–Wesley Publishing Company, World Student Series Edition (1977).
B. L. Booth, "Photopolymer Material For Holography" Applied Optics, vol. 14, No. 3, (Mar. 1975).
P. Hariharan, "Optical holography, Principles, techniques and applications", Cambridge University Press, (1986).
R. W. Ditchburn, "Diffraction", London Academic Press, 3rd ed. (1976), pp. 152–154.

*Primary Examiner*—Martin Lerner
*Attorney, Agent, or Firm*—Webb Ziesenheim Bruening Logsdon Orkin & Hanson

[57] ABSTRACT

There are disclosed variations on a basic technique for forming a diffusion or rear-projection screen comprising an array of microlenses formed by selective light exposure and consequent selective polymerization of a sheet of photopolymerizable material. Thus, the lenses may be made elongate in a preferred direction transverse to the lens axes by exposure through a mesh formed with an array of slots. The lenses may be graded refractive index lenses having a surface relief adding to the lens power, such relief being formed naturally or by molding. The photopolymerizable material may be exposed by laser light, for example to a holographic pattern and such exposure may be made through a quarter-wave plate continuously rotated to eliminate micro defects. Enhanced lens powers may be achieved by heating the photopolymerizable material to close to the softening temperature of the associated polymer before exposure to light and maintaining the material at that temperature during the resultant polymerization.

4 Claims, 8 Drawing Sheets

MICROLENS SCREENS, PHOTOPOLYMERISABLE MATERIALS AND ARTIFACTS UTILISING THE SAME

THIS INVENTION relates to light diffusing screens and other artefacts comprising arrays of microlenses, to methods of making such screens and artefacts or light diffusing materials therefor to the manufacture of such artefacts and materials using photopolymerisable materials, to the fabrication of microlenses and other microstructures, and to the manufacture of graded refractive index lenses and other products. The invention also relates to an optical printing method and apparatus capable of being realised using a component formed of graded refractive index material.

Our published British Patent Application GB2206979A (8812644.6) discloses, inter alia, a technique for forming a microlens diffusing screen, for example for television, which comprises a transparent sheet bearing an array of microlenses, and in which the microlenses are in the form of graded refractive index lenses formed by selective exposure of a photopolymer to a pattern of dots, such exposure being in ultra-violet light or suitable visible light and being effected by "contact" exposure through a mask having an array of circular holes formed therein, or by spot-by-spot exposure using a scanned ultra-violet laser, or by ultra-violet holography.

It is one object of the present invention to provide an improvement in the above-noted technique disclosed in GB2206979A whereby such a screen may be arranged to disperse light substantially more in one dimension parallel to the plane of the screen than in a perpendicular direction, that is to say, whereby the screen will have different polar distribution for light diffused thereby, about two mutually perpendicular axes. Thus, for example, as applied to a television screen onto which light is projected from a luminous source such as a cathode ray tube, it may be arranged that the range of angles about a vertical axis relative to the screen over which the screen will appear acceptably bright to an observer will be substantially wider than the corresponding range about a horizontal axis, thereby utilising more efficiently the image-forming light directed to the screen from the luminous source, bearing in mind that, in a typical viewing situation in which a plurality of observers are viewing the screen simultaneously, or in which a single observer may view the screen from various positions, the screen will generally be approximately at the eye-level of the observer, but the observer will not necessarily be in front of the screen.

According to one aspect of the present invention, the individual microlenses in the array are elongated in one direction in the plane of the screen, so that a middle region of each microlens acts as a cylindrical lens whilst the end regions thereof act as respective parts of respective spherical lenses.

The terms "cylindrical" and "spherical" used above are used merely to describe the mode of operation of the lenses. The lenses themselves are preferably, as in GB2206979A, formed by graded refractive index effects in a photopolymer layer bounded by substantially planar surfaces, or by surfaces having some surface relief effects as an artefact or by-product of the method used to form the graded refractive index lenses.

The present invention, in another aspect, concerns various other uses for a microlens screen or analogous light-transmitting material, hereinafter referred to as "the microlens material", in the form of a transparent polymeric sheet incorporating an array of graded refractive index microlenses. Such a microlens screen acts as a very efficient rear projection/diffusion screen exhibiting reduced scatter of light to undesired angles and a reduction in the "hot spot" effect.

In one class of such use, the microlens material performs a straightforward diffusion or light-directing function independently of any projection or optical system. For example, such sheet material may be applied as a film to glass used architecturally, e.g. for glazing windows and doors, or may, for such a purpose, be sandwiched between two sheets of glass or rigid transparent plastics to afford a more refined version of the known "frosted" or surface-textured glass commonly used in such applications. Such microlens material, supported in such manner by rigid glass or plastics transparent sheets may also be used as "privacy glass" for example in bathroom shower cubicles and the like.

Such microlens material may also be applied to, or incorporated in, diffusing structures or panels for, for example, electric lamps, in domestic or public buildings. In this context, use may be made of the possibility, as disclosed in Application No. 8812644.6, of controlled orientation of the substantially "cylindrical" graded refractive index lenses in such material to achieve preferential direction of light from a lamp or other light source in a particular direction. Such material may also have application in the automotive field, for example in illumination of dashboard displays or as an adjunct to the normal vehicle headlamps or tail-lamps, for example, to improve the directionality of such lamps and reduce the scattering of light from such lamps in directions not required by the driver of the vehicle having the lamps and which tends to dazzle, or be a distraction or irritant to drivers of other vehicles.

Such material may also, of course, be utilised in image projection applications other than TV and the like systems, for example in the focusing screens of reflex cameras, in slide and film viewers for domestic and other use, where ground glass or correspondingly textured acrylic screens are conventionally used, in analogous industrial projection systems, and so on. The polymeric sheet material incorporating the microlenses lends itself well to the construction of large-scale video displays as the sheet material can readily be cut and trimmed to form respective sections which are suitably supported, in abutment with one another, to form a composite large-scale rear projection screen. In all of these applications, the ability of the microlens material, suitably configured, to ensure that most of the light passing through the microlens screen is directed to the region at which the viewer's eye is or may be located, and that little is scattered to angles outside the viewing area, provides a subjectively bright image suitable for "daylight" viewing.

When the material is used in c.r.t., TV and VDU applications in which individual picture units or "pixels" appear at predetermined locations in the screen area, the arrangement may be such that a respective microlens is allocated to and aligned with each "pixel", affording enhancement of viewing. Furthermore, it is possible, in computer monitor and the like applications in which respective areas of the screen form predetermined character display areas, for each such character area to be allocated a respective microlens. (In this instance, the microlenses may be of correspondingly large scale).

A microlens screen comprising such polymeric microlens material may be detachably mounted on the front of a VDU, so as to be interchangeable with other such microlens screens with microlenses of different characteristics, array pitches, lens diameters, etc. suited to selected display types.

In such applications, the microlens material may be supported on a rigid planar transparent glass sheet arranged in front of the c.r.t. screen (in which case the flat sheet, used in conjunction with a conventional outwardly convex c.r.t. screen may touch the latter screen at the centre but will be spaced somewhat therefrom at locations further from the centre and will be spaced furthest from the c.r.t. in the region of the corners of the screen.

Alternatively, the polymeric microlens sheet material may be detachably adhered directly to the VDU screen. Thus, for example, the VDU screen may be arranged to have a cylindrical screen surface and the polymeric microlens sheet material may be wrapped around the cylindrical surface of the screen and adhered directly thereto.

It is further contemplated that an array of multiple-element microlenses may be formed by sandwiching together a plurality of polymeric sheets, each with a respective array of graded refractive index microlenses thereon, so that each microlens in one sheet is superimposed with corresponding microlenses in the other sheet of the sandwich, each set of superimposed "simple" microlenses together forming a respective compound or multiple-element microlens. The polymeric sheet material, or such a sandwich of polymer sheets, may be applied to or sandwiched with a liquid crystal display arrangement, such as a multi-pixel TV or VDU LCD screen.

Such microlens material may also be used, in certain applications, in conjunction with fibre optics.

It is further envisaged that the polymeric microlens material may be used to advantage in high definition TV systems, to optimise the performance of the latter.

It is an object of the present invention, in yet another of its aspects, to provide an improved microlens screen or light-diffusing sheet material.

According to this aspect of the invention there is provided a sheet of transparent material formed with an array of integral graded refractive index microlenses wherein each microlens terminates, on at least one of the surfaces of the sheet, in a surface relief formation which adds to the power of the respective microlens.

The invention also includes, within its scope, a single graded refractive index lens having at least one of its end surfaces formed as a convex or concave lens surface.

In a preferred embodiment described in GB226979, to which reference should be had, the graded refractive index lenses are formed in a layer of a photopolymer by selective polymerisation of a photopolymerisable resin, such polymerisation having been produced by correspondingly varying the exposure to light of the layer of resin, (or at least the corresponding layer of the corresponding monomer) over the area of the sheet, during manufacture. In the preferred method, disclosed in GB 2206979, the selective exposure is achieved by exposing the monomer/photopolymer layer to ultraviolet light through a mask, having an array of holes therethrough corresponding to the desired array of microlenses.

The present invention, in another of its aspects, concerns variants of the preferred form of screen disclosed in GB 2206979 and of the material used to form such screen and novel methods which may be utilised for the manufacture of such variants.

It is among the objects of the present invention to provide a light-diffusing material of enhanced power.

Thus, according to another aspect of the invention there is provided a method of making a light diffusing material comprising a sheet of light-transmitting base material, having a surface thereof configured to afford an array of microlenses, coating the base material with a layer of a medium, such as a photopolymer, of which the refractive index can be varied by exposure to light, then exposing the variable refractive index medium to light through the said base material having said microlenses formed thereon, whereby the localised variation in intensity of said light, through the variable refractive index medium, produced by said microlenses, causes corresponding variations in refractive index in said medium whereby there is produced, in said medium, an array of graded refractive index lenses each aligned with, and adding its optical effect to, a respective said microlens of the base material.

According to yet another aspect of the invention there is provided a method of making a light diffusing material comprising forming a sheet or layer of a medium, such as a photopolymer, of which the refractive index can be varied by exposure to light, one surface of said sheet or layer being moulded or embossed to afford an array of microlenses, exposing the sheet or layer of said medium to light through said moulded or embossed surface, whereby the localised variation in said light, through the variable refractive index medium, produced by refraction at said moulded or embossed surface, causes corresponding variations in refractive index in said medium, whereby there is produced, in said medium, an array of graded refractive index lenses each aligned with, and adding its optical effect to, a respective microlens surface defined by said moulding or embossing.

According to a further aspect of the invention there is provided a light diffusing screen comprising a transparent base sheet which has a Fresnel lens or prism formed on one surface thereof by a moulding or embossing step, and which is coated, on the opposite surface thereof, with a layer of a variable refractive index material incorporating an array of graded refractive index lenses.

In the preferred method of forming a microlens screen disclosed in our Application No. 8812644.6, the graded refractive index lenses are formed by selective exposure of the photopolymeric material, (or rather of the corresponding monomer) to laser light, for example from an ultra-violet laser.

The applicants have found that, in an array of graded refractive index microlenses formed by the above-noted method, using laser light for exposure of the photopolymer, the microlenses formed have optical defects in the form of a microstructure, within the lens, constituted by highly localised variations in refractive index. It has been discovered, by the inventor of the present invention, that such microstructure within the microlenses is attributable to polarisation of the laser light.

It is an object of the present invention, in yet another aspect, to provide an improved method of manufacturing a microlens array of the kind referred to by which the above-noted defects, due to such microstructure, can be avoided.

According to the last-noted aspect of the present invention there is provided a method of manufacturing a microlens screen of the type specified, by selective exposure of the photopolymer, or the corresponding monomer, to laser light, wherein a quarter wave plate is interposed between the source of laser light and the photopolymer and wherein, during exposure, the quarter wave plate is rotated or rotationally oscillated, about an axis perpendicular to its opposite faces, (i.e. perpendicular to the fast and slow axes), whereby, during exposure, the polarisation of the laser light within the photopolymer is continuously varied, to eliminate micro-defects due to such polarisation.

The source of laser light may comprise a scanning laser arranged to expose the areas of the polymer in which microlenses are to be formed on a spot-by-spot basis through an appropriate optical mask formed with the corresponding array of circular light-transmitting apertures as discussed In British Patent Application No. 8812644.6.

In the preferred method disclosed in our Application No. 8812644.6, the graded refractive index lenses are formed by exposure of the photopolymeric material to laser light, for example from an ultra-violet laser, through a clear-dot mask, the arrangement being such that the photopolymer layer is scanned, through the mask, by the laser beam.

It is yet another object of the present invention in another of its aspects, to provide an improved method of forming such a graded refractive index microlens screen.

According to this aspect of the invention, there is provided a method of making a microlens screen comprising a layer of transparent photopolymeric graded-refractive index material in which the array of microlenses in the screen are formed as graded refractive index lenses, the method comprising forming holographically in a layer of said photopolymer or the corresponding monomer, an image of a varying light pattern corresponding to the desired array of microlenses.

The size of the area of the photopolymer which can conveniently be exposed in the above manner in a single exposure, although large enough to contain a large number of such microlenses, is still relatively small, (in relation, for example, to the size of screen desirable as a rear projection screen for a rear-projection television system), and accordingly, in a preferred embodiment of the invention, an extended area of the photopolymer layer is exposed in a succession of adjoining blocks, in a scanning mode, so that successive rows of such adjoining blocks are exposed one after the other, the adjoining blocks in each said row being exposed one after the other in successive scanning steps.

GB 2193344 discloses, in the production of monolithic integrated circuits, a technique for exposing a photoresist-coated silicon slice to the optical image of a desired circuit pattern, in which the image on the photoresist is produced holographically, in laser light, from a hologram embodied in a variable-refractive index photopolymer coating on the hypotenuse face of a right-angle prism, the resist-coated silicon slice being positioned immediately adjacent said hypotenuse face and the laser light being projected towards that hypotenuse face from within the prism, through one of the other faces of the prism. The manner in which the hologram is initially produced in the photopolymer layer on the hypotenuse face of the prism is likewise disclosed in GB 2193344 and utilises a "mask" bearing the desired circuit pattern and which is located adjacent to the photopolymer layer on said hypotenuse face during creation of the hologram.

The present invention proposes to utilise a modification of the technique of GB 2193344 for the production of an array of graded refractive index microlenses in a layer of a graded refractive index photopolymer. In the technique of the present invention, the hologram on the hypotenuse face of the prism is produced, in the same manner as disclosed in GB2193344 but using, in place of a mask bearing a desired circuit pattern, a mask affording an array of transparent "holes" (the mask being otherwise opaque), said array corresponding with the desired array of microlenses in the finished product.

It is another object of the invention to provide a method of producing microlenses of enhanced power by selective photopolymerisation of certain transparent synthetic materials. The invention affords, inter alia, an improved method of manufacturing a screen of transparent material incorporating an array of integral microlenses, such a screen being herein referred to, for convenience, as a "microlens screen".

There is disclosed in WO80/09952 a method of making a microlens screen by selective graded exposure to light of a layer of a photopolymerisable variable refractive index substance, such as acrylamide, to produce an array of microlenses which are in the form of graded refractive index lenses.

Thus, according to yet another aspect of the invention, microlenses of enhanced optical power are produced in a photopolymerisable substance by raising the temperature of said substance to close to the softening temperature of the associated photopolymer before selective polymerising exposure of the substance, then selectively exposing the substance to light whilst maintaining the substance at an elevated temperature and permitting selective polymerisation of the substance, at an elevated temperature before cooling or allowing to cool.

The invention may be applied to the production of a microlens screen by providing the transparent photopolymerisable substance as an extended layer and exposing said layer, in the exposure step, to a light pattern comprising an array of dots, to provide a corresponding array of microlenses in said layer by the corresponding selective photopolymerisation of the substance.

It is thought that the enhancement of the lens power resulting from the invention is related to the softening of the photopolymer as it is formed and an increased mobility of the as yet unpolymerised, or only partially polymerised components, but it is not intended to limit the invention to any particular theory as to the mechanism involved.

In a preferred embodiment of the invention a layer of a substance, such as acrylamide monomer, capable of selective graded photopolymerisation under correspondingly graded exposure to ultraviolet light, is provided on a supporting substrate, which itself forms or carries an optical mask consisting of an array of light-transmitting areas of "holes" in an opaque field. The supporting substrate may comprise a stable transparent plastics film to which the monomer layer is applied and which, in effect, is an exposed and developed silver halide photographic film and thus carries, on its face remote from the monomer layer a gelatin layer bearing silver grains defining said opaque background. The photographic film has been exposed, in conventional manner, by way of a master screen, to the desired optical pattern comprising an array of dots, the exposed film having been subsequently developed, conventionally to form the mask associated with the monomer layer. The exposure and/or development of the silver halide film may take place before or after the coating of the stable plastics film with the acrylamide monomer.

The composite material, comprising the monomer layer on the supporting substrate with optical mask is first heated to a temperature close to the softening temperature of the corresponding polymer (e.g. polyacrylamide) and is then exposed to ultraviolet light, through the masking layer, to bring about the desired selective polymerisation. The elevated temperature is preferably maintained while such polymerisation proceeds, the material being thereafter allowed to cool. The product may then be submitted to a conventional photographic bleaching process to remove the silver from the masking layer and render the latter wholly transparent. However, for some applications, the regions between the "holes" in the masking layer may be kept opaque to absorb unwanted scattered or reflected light, for example where the microlens screen is intended for a television screen.

As one surface of the monomer layer is free during exposure and photopolymerisation, the layer is also free to undergo an associated surface distortion at that free surface, in the form of a convex "bump" or dome above each polymerised region. Depending upon the conditions, and the photopolymerisable substance, there may also be a variation in refractive index accompanying the selective photopolymerisation, contributing a graded refractive index converging lens component to each microlens in addition to the component due to said surface distortion, so that the optical converging effects of the surface distortion and the refractive index variation enhance one another. It is assumed, in the above, that the microlenses in question are converging lenses, but if an array of diverging microlenses were produced by the same technique, any refractive index variation would also be the converse of that occurring in the production of an array of converging microlenses so that the surface distortion and any refractive index variation would again both enhance the power of the microlenses.

It will be appreciated that the present invention may be applicable both to systems where the effect of the microlenses is derived substantially from graded refractive index variation, with no significant contribution from surface relief effects, i.e. where the microlenses are substantially graded refractive index lenses and to systems where the effect of the microlenses is derived substantially from the surface relief effect with no significant contribution from graded refractive index effects, as well as to systems where both effects make a significant contribution.

It is envisaged that the monomer-coated silver halide film material would be produced, on a volume production basis, in the form of a continuous length, which would pass longitudinally through various stations at which the respective steps of the production method would be carried out. Thus, in such a method, the monomer-coated film would pass through an exposure station at which ultraviolet light would be directed onto the medium from the side nearest the masking layer, and at which radiant heat, for example from infra-red sources, would be directed onto the opposite surface of the medium in order to maintain the monomer/photopolymer layer at the desired temperature during and after exposure. Further radiant heat sources might be disposed slightly upstream of the exposure station to raise the temperature of the monomer before passing into the exposure station. Subsequent steps in the process would then be carried out in successive stations following the exposure station in a manner which will be evident to those skilled in the art.

It is an object of the present invention, in yet another of its aspects, to provide an improved method of fabricating optical microstructures, such as an array of spherical or cylindrical microlenses or Fresnel lenses or prisms, or analogous reflective structures.

According to this aspect of the invention, there is provided a method of producing an optical microstructure, comprising the steps of:

providing a photographic material comprising a silver halide emulsion layer on a supporting substrate, exposing the photographic material to a desired pattern of irradiance, processing the material to produce, in said emulsion layer, a relief pattern corresponding to said pattern of irradiance, and using the relief-patterned emulsion surface as a master, for the production, by a moulding, embossing or the like technique, of a sheet of transparent plastics material having a corresponding or complementary surface relief pattern forming said optical microstructure.

In one embodiment, an embossing surface on an embossing tool is derived from the relief-pattern emulsion surface, and the embossing tool is thereafter used to form said optical microstructure in a sheet of transparent plastics material by embossing a sheet of plastics material with said embossing tool.

Where such an embossing tool is to be formed, in order to derive said embossing surface from said relief-patterned emulsion surface, a deformable plastics material may be applied to the relief patterned emulsion surface, using heat and/or pressure, so that a surface of said plastics material conforms at least approximately with said relief patterned emulsion surface, the deformed plastics material being subsequently detached from the emulsion layer and the corresponding relief surface of the deformed plastics material used for the creation, by an electroforming or electrotyping technique, of a correspondingly relief-patterned embossing surface, of nickel or other hard material, of an embossing tool.

Alternatively, the relief-patterned emulsion surface may itself be used as a mould surface to which a transparent plastics material may be applied by a casting or moulding technique, to provide a transparent plastics sheet having a complementary surface incorporating said optical microstructure, the plastics material subsequently being stripped from the photographic material.

Preferably said processing of the photographic material includes the step of developing the material to convert exposed silver halide grains in the emulsion to silver, and etch bleaching of the developed layer to produce etch pits in the regions previously occupied by the silver image.

It is an object of the invention in yet another of its aspects to provide an improved optical printing system capable of rapid, high-resolution printing.

According to the invention there is provided an optical printing system comprising an image screen, a member providing a photosensitive surface and means for advancing such surface in a direction perpendicular to that in which it faces, through an exposure zone, a plurality of light guides each having an entrance end juxtaposed with a respective area of said screen and an exit end arranged in a respective location in said exposure zone, and means for illuminating respective said areas of said screen selectively as the photosensitive surface is advanced through said zone, so as to expose said photosensitive surface selectively in a plurality of adjacent columns as the surface is advanced to build a visible or latent image on said surface.

In a preferred embodiment, said light guides are formed by localised refractive index variations in a transparent sheet of a variable refractive index material having at least a portion thereof, accommodating said entrance ends of the light guides, overlying said screen and having said axis ends lying in an edge of the sheet located in said exposure zone.

Figure 1:
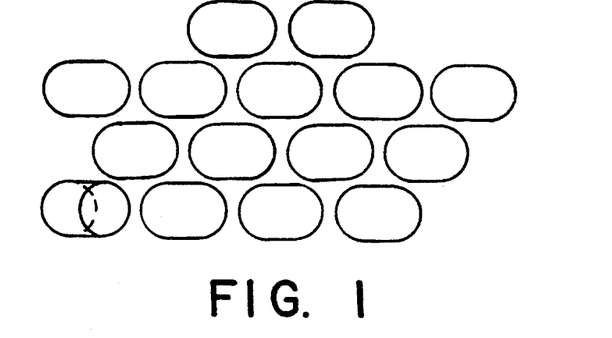
FIG. 1 is a diagrammatic plan view illustrating an array of elongated microlenses in accordance with one embodiment of the invention.

Embodiments of the invention are described below, by way of example, with reference to the accompanying diagrammatic drawings, wherein:

FIG. 1 illustrates a part of a screen according to claim 1 herein, by the method of claim 2 herein.

The elongation of the microlenses is preferably obtained, in a process as disclosed in GB 2206979A, by exposing the photopolymer layer, supported on a substrate, to ultraviolet light, or suitable visible light, through a mask having an array of light-transmitting patches or "holes", the process differing from that of GB 2206979A in that the light-transmitting patches or "holes" are elongate in correspondence with the desired elongate form of the microlenses.

Such a mask may be formed by a photolithographic technique in which a photo-sensitive recording layer is exposed optically to an image comprising an array of circular dots, the elongation of the corresponding areas of the photosensitive layer being achieved by imparting a slight translational movement to the recording layer during such exposure.

As a result, in the direction of motion of the recording layer, an elongation of each dot of the array occurs, which changes the profile of the "dot", which would otherwise be circular, to an elongated area with semi-circular ends. Conventional processing of the thus-exposed mask material produces a mask which, applied to the photopolymer material in a contact copying situation, automatically creates elongated microlenses with different optical powers in orthogonal directions.

The accompanying drawing shows, diagrammatically, a portion of a microlens screen embodying the invention, illustrating the elongated microlenses. It will be appreciated that, whilst the individual lenses shown are shown as being bounded by closed lines, there will be no lines, as such, in the screen formed. The lines illustrated are merely lines connecting points of equal refractive index.

Figure 2:
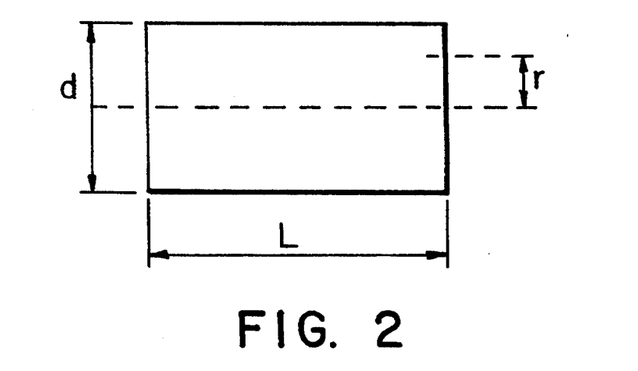
FIGS. 2 and 3 illustrate graded refractive index lenses, not embodying the invention.
Figure 3A:
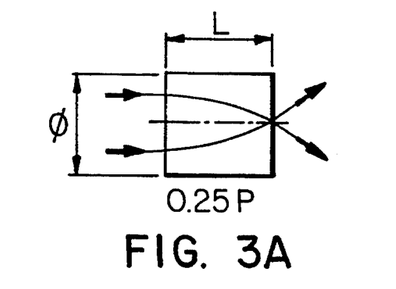
Figure 3B:
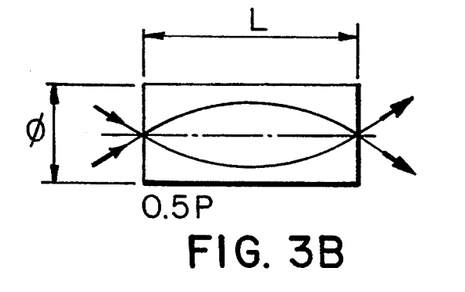
Figure 3C:
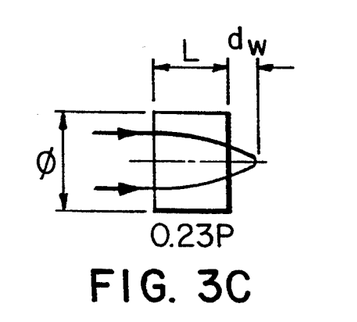
Figure 3D:
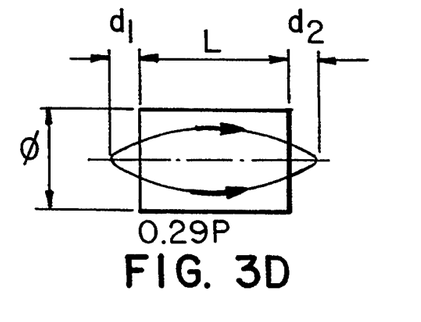
Figure 3E:
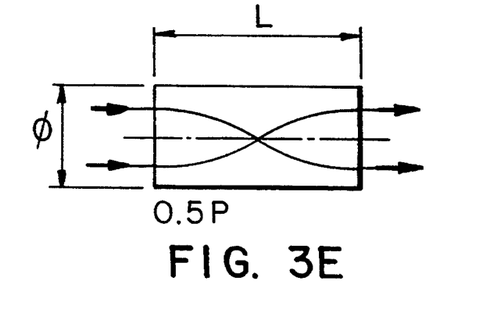

Referring to FIGS. 2 to 5 relating to embodiments of the invention according to claim 4 herein, FIG. 2 shows a typical GRIN lens structure.

The parameters of a GRIN lens are specified thus:

The refractive index is engineered conventionally to be parabolic with r. Thus $$n_r = n_{oo}\left[1 - \frac{A}{2}r^2\right]$$

Here $n_{oo}$ is the refractive index on the optical axis and A is a positive constant. It is assumed in the above that the refractive index decreases with r, so that the lens has the effect of a conventional convex lens.

We define the pitch P as follows:

$$P = 2\pi/\sqrt{A}$$

If we know the pitch, we can define various imaging characteristics by varying the length of the lens.

FIG. 3 shows a variety of imaging conditions for GRIN lenses.

As disclosed in our co-pending Patent Application No. 8812644.6, an array of such lenses can be formed in a layer of a photopolymer such as polyacrylamide, and varying the length of each GRIN lens would correspond, in this case, to varying the thickness of the imaging medium.

Figure 4:
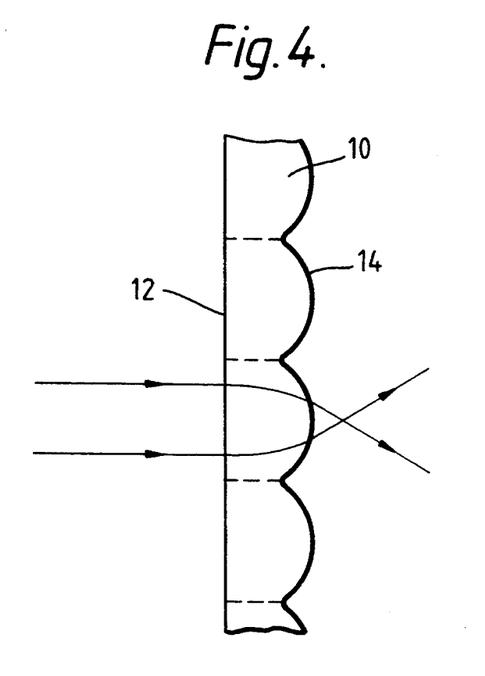
FIGS. 4 and 5 are diagrammatic representations, similar to FIG. 3 but illustrating the action of lenses embodying the invention.

The lenses illustrated in FIG. 4 are similar to those illustrated in FIG. 3 except that, in FIG. 4, each lens has one end face which is convex about a radius of curvature lying on the lens axis, so that, in addition to the variation in refractive index with radial distance from the lens axis, within the lens itself, there is a "conventional" lens effect resulting from the refraction at the air/lens material interface at the convex end surface of the lens.

As disclosed in our co-pending Patent Application No. 8812644.6 an array of graded refractive index lenses may be formed in a light-transmitting sheet by using, as the sheet, a layer of a photopolymer material which has been selectively exposed optically to a pattern of dots. For a fuller treatment of the process involved and of the theoretical and other considerations underlying graded refractive index GRIN lenses, reference should be had to that pending application.

It has now been found that there can be advantages in combining the graded refractive index lens structure with features of conventional lens configuration to afford arrangements which act in a manner analogous to conventional compound lens arrangements. Thus, referring to FIG. 4, a photopolymer layer 10 having formed therein an array of graded refractive index lenses with their axes perpendicular to the major dimensions of the sheet, as described generally in our co-pending Application No. 8812644.6, has additionally, on the surface of the photopolymer layer remote from the photopolymer/substrate interface 12, a relief pattern comprising a plurality of convex domes 14, each approximating to a part-spherical surface having its centre of curvature lying on the axis of a respective one of the graded refractive index microlenses. Each such domed surface thus acts as a conventional convex lens surface, whereby the optical powers of the graded refractive index and convex-surfaced components are added, affording microlenses of enhanced power.

Figure 5:
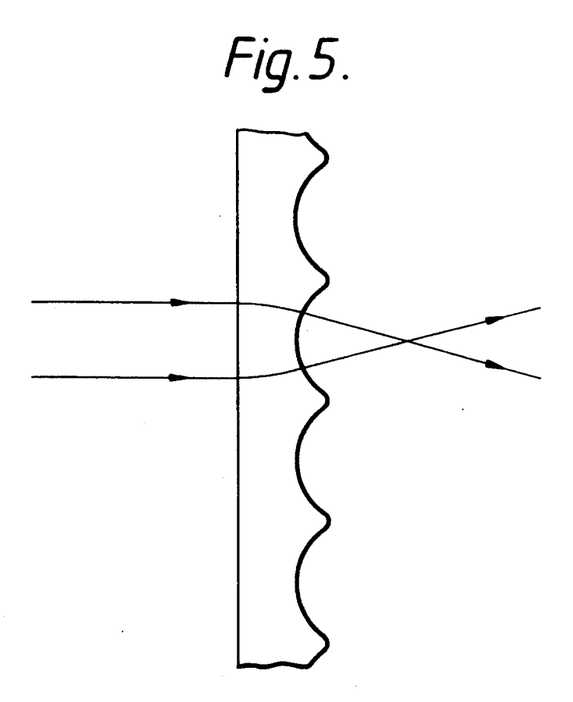

It is, of course, also possible, for example as a means of correcting aberration in the microlenses, in situations where such aberrations are of importance, to provide the graded refractive index layer 10 with a surface relief configuration affording a respective concave surface portion for each graded refractive index microlens, as illustrated in FIG. 5 so that the surface-refractive component of the lens has a negative power. Likewise, it is possible for each microlens to have a graded refractive index component affording a negative power, i.e. tending to act as a diverging lens, with the surface-refractive component providing a counteracting positive power. In the last-noted two cases, the resulting combined effect may be either that of a converging lens or that of a diverging lens. It is also possible, of course, to have both the graded refractive index component and the surface refractive component contribute respective negative optical power components to the combination, so that the latter operates as a diverging lens.

It has been found that a configuration such as described with reference to FIG. 4 can be produced without the necessary for any distinct surface-forming step, as a by-product of the selective polymerisation resulting from the selective exposure of the photopolymer (or rather, the photo-sensitive monomer). However, it will be appreciated that a desired surface-relief pattern may be imposed upon the photopolymer layer, either before or after the selective polymerisation, by other means, for example by a mechanical moulding or pressing step, by an etching step or the like. Alternatively, the surface of the substrate to which the polymer/monomer layer is applied, may be appropriately configured in relief, so that the desired surface-refractive effects occur at the polymer/substrate boundary, or, where the polymer is subsequently stripped off the substrate, at the surface of the polymer which was formerly in engagement with the substrate.

Whilst the preferred application of the invention is to the production of an array of microlenses in a photopolymer sheet, it will be appreciated that individual lenses on a substantially larger scale and having the same sort of surface configuration may be produced.

It will likewise be understood that, if desired, both end surfaces of each graded refractive index lens may be convexly or concavely curved as desired.

Figure 6:
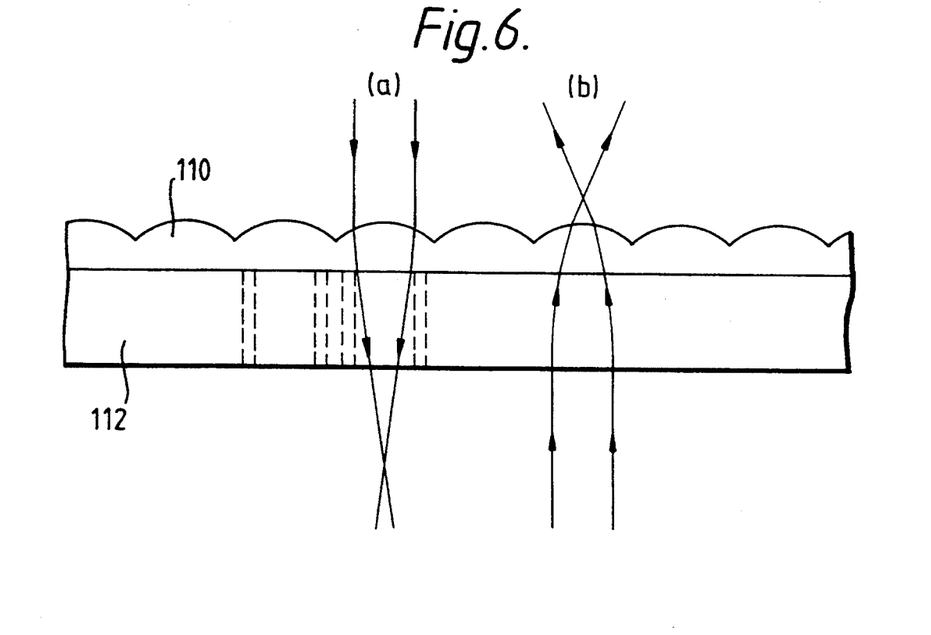
FIG. 6 is a schematic sectional view showing a light-diffusing material according to the present invention.
Figure 7:
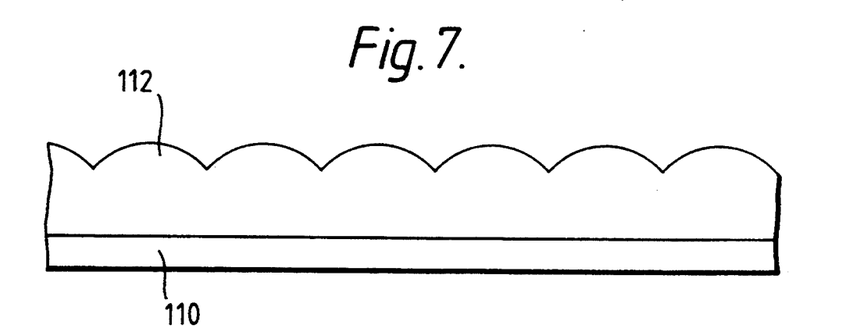
FIG. 7 is a corresponding sectional view of a further form of light-diffusing material embodying the invention.
Figure 8:
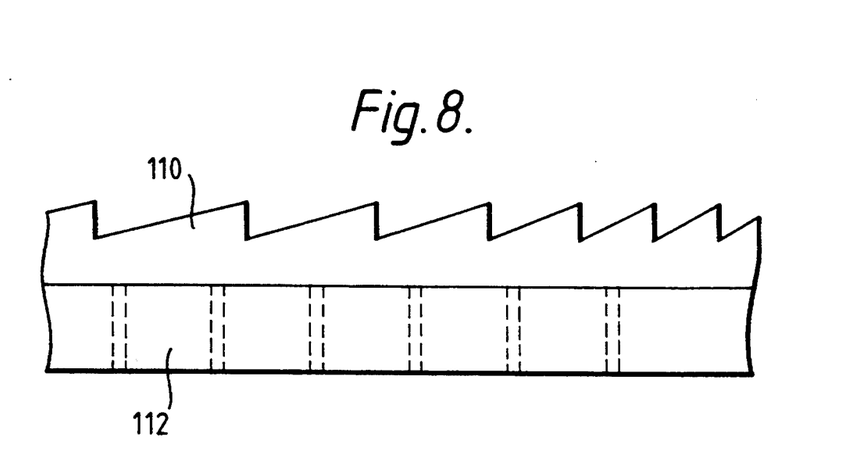
FIG. 8 is a similar sectional view of a further light-diffusing material embodying the invention.

FIGS. 6 to 8 relate to embodiments of the invention according to claims 5 and 6 herein.

Referring to FIG. 6, a light-diffusing material is manufactured by coating a stable transparent base sheet, for example of polyester, with a layer of a photopolymerisable resin, such as a polyacrylamide resin of a type discussed in more detail in GB 2206979 and subsequently exposing the photopolymerisable layer to ultraviolet light to form an array of graded refractive index (GRIN) lenses therein. In the product illustrated in FIG. 6, the selective exposure is achieved, not by utilising an optical mask, as in GB2206979, but by providing a transparent base sheet 110 with a surface configuration such that the base sheet 110 itself comprises an array of microlenses and using the last-noted array of microlenses to vary selectively the intensity of the exposure light from point to point in the photopolymer. Thus, in the arrangement illustrated, one surface of the base sheet 110 comprises a close-packed array of minute convexly domed regions whereby an array of converging microlenses is formed. In the example illustrated in FIG. 6, the layer 112 of photopolymerisable resin is applied to the opposite surface of the base sheet 110 from the embossed surface. The product is exposed to light from the side afforded by the base sheet 110, such light being directed substantially at right angles to the general plane of the composite material and the exposure to light being substantially uniform over the material. However, due to the converging effect of the individual convexly domed surface regions, the light striking each such region is converged, as indicated at (a) in FIG. 6, towards the optical axis of the microlens defined by each such region, whereby the underlying photopolymer layer 12 is exposed to a higher intensity of light, closer to such axis than further therefrom. As a result, the degree of polymerisation varies with the distance from such axis producing, beneath each domed surface region, a corresponding graded refractive index (GRIN) lens in the layer 112. Thus, as illustrated at (b) in FIG. 6, the converging effect of each domed region of the layer 110 will be enhanced by the converging effect of the underlying (as viewed in FIG. 6) graded refractive index microlens.

Whilst, in the above description with reference to FIG. 6, it has been assumed that the ultraviolet light used for the exposure strikes the sheet material substantially at right angles thereto, in some circumstances it may be desired to illuminate the material from a localised source placed above the material, so that the graded refractive index microlenses formed at locations progressively further from the point where the perpendicular to the sheet from the localised light source intersects the sheet will be progressively angled, in a manner similar to that described in relation to FIG. 12 in GB2206979.

It will be appreciated that, if desired, the base sheet 110 may be embossed or otherwise formed with an array of part-spherical concave hollows, resulting in an array of concave or diverging microlenses, whereby the exposure of the base sheet/polymerisable layer composite to ultraviolet light through the base sheet 110 will produce a corresponding array of diverging graded refractive index microlenses.

It will also be appreciated that it is possible, as illustrated in FIG. 7, to emboss or mould the photopolymerisable layer 112, rather than the base sheet 110, with an array of domed regions and to expose the photopolymerisable layer from the side of the light remote from the base sheet 110, the surface-refractive effect of the domed portions of the exposed surface of the layer 112 being relied upon to produce the desired concentration of light towards the axis of each microlens so that the consequent variation in graded refractive index enhances the effect of refraction at the surface of the layer 112 for each of the resulting microlenses.

As shown in FIG. 8, it is also possible to configure the surface of the base sheet 110 remote from the photopolymerisable layer 112, in a manner known per se, as a Fresnel lens or prism and to form the graded refractive index microlenses in the layer 112 by exposure, from the side remote from the base sheet 110, through an appropriate mask, in the same way as disclosed in GB 2206979, to form an array of graded refractive index microlenses in the layer 112, whereby the product has the effect of a combined converging (or diverging) lens or prism with a diffusing screen, to afford characteristics particularly suited to a particular situation of use, for example as a back projection screen.

Figure 9:
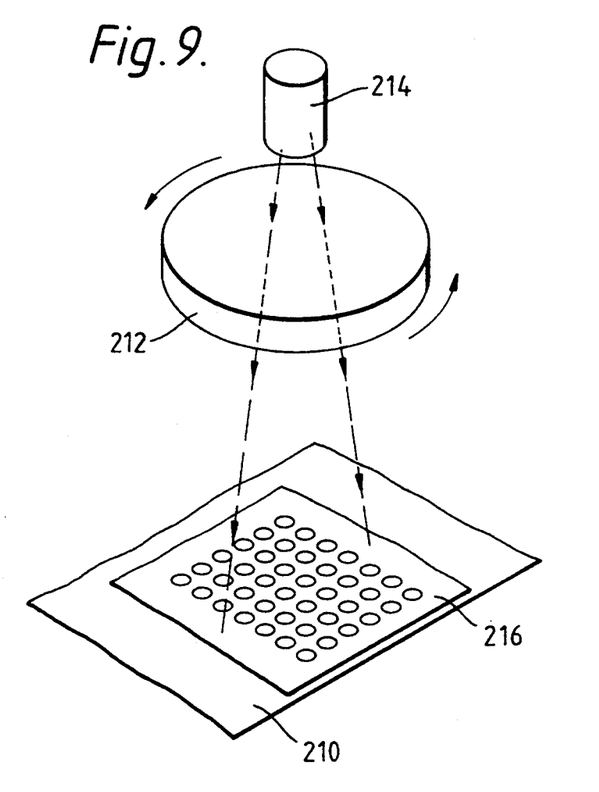
FIG. 9 is a schematic perspective view illustrating the production of a microlens screen.

FIG. 9 relates to an embodiment of the invention according to claim 7 herein.

FIG. 9 illustrates schematically a scheme for carrying out the method, the photopolymer/monomer layer being indicated at 210, the optical mask at 216, the quarter wave plate at 212, and the source of laser light at 214.

Alternatively, the photopolymer layer may be arranged to be exposed holographically, using a technique similar to that disclosed in published U.K. Patent Application GB2193344A, for exposing silicon slices, holographically to desired circuit patterns by reconstructing on such slices the image of the desired circuit patterns by illumination, by means of a reference laser beam, a hologram formed in a variable refractive index layer applied to the hypotenuse face of a right angle/45° prism. In that technique, the reference beam is directed through one of the two perpendicular faces of the prism, to be internally reflected at the outer surface of the layer of variable refractive index material and emerge from the other of the two perpendicular faces, whilst light from the hologram passes through said outer surface of the variable refractive index layer to form the desired reconstructed image, on a silicon slice disposed parallel with said hypotenuse face but spaced therefrom.

In the presently proposed variation of technique of GB 2193344A to form microlenses in a photopolymer layer, the photopolymer layer is substituted for the silicon slice, and the hologram on the hypotenuse face of the prism is one formed by exposure of the variable refractive index material on the hypotenuse face under the conditions described in GB2193344A but replacing the mask in the form of an integrated circuit with a mask in the form of a clear dot screen.

In practice, using the modified technique of GB 2193344A, only a relatively small area of the microlens screen can be exposed at a time, and so it is preferred to scan the photopolymer layer, exposing successive small "blocks" of the surface of the layer at a time, the laser source and prism, with the variable-refractive index hologram being constructed as a unit and said unit being "scanned" stepwise back and forth over the photopolymer layer with the latter being advanced by the width of one "block" at the end of each scan, and exposure of a single "block" being made at each step during each "scan". Alternatively, the laser, prism and hologram may be kept stationary and the photopolymer layer "scanned" stepwise past the prism. In either case, the photopolymer layer is exposed on a block-by-block basis. The rotating quarter wave plate in each case is disposed to intercept the laser light before it strikes the photopolymer. In principle, the rotating quarter wave plate may be interposed at any location between the laser and the photopolymer but is most conveniently positioned directly adjacent the exit window of the laser or directly in the path of the laser beam immediately emerging from the laser.

The method according to the invention allows a substantial improvement to be obtained in the quality of microlens screens produced by laser-exposure of photopolymeric material, the latter technique being itself the preferred technique for forming such screens and the only practical technique to date for producing such microlens screens in which the optical axes of the individual microlenses are angled with respect to the normal to the plane of the screen.

Figure 10:
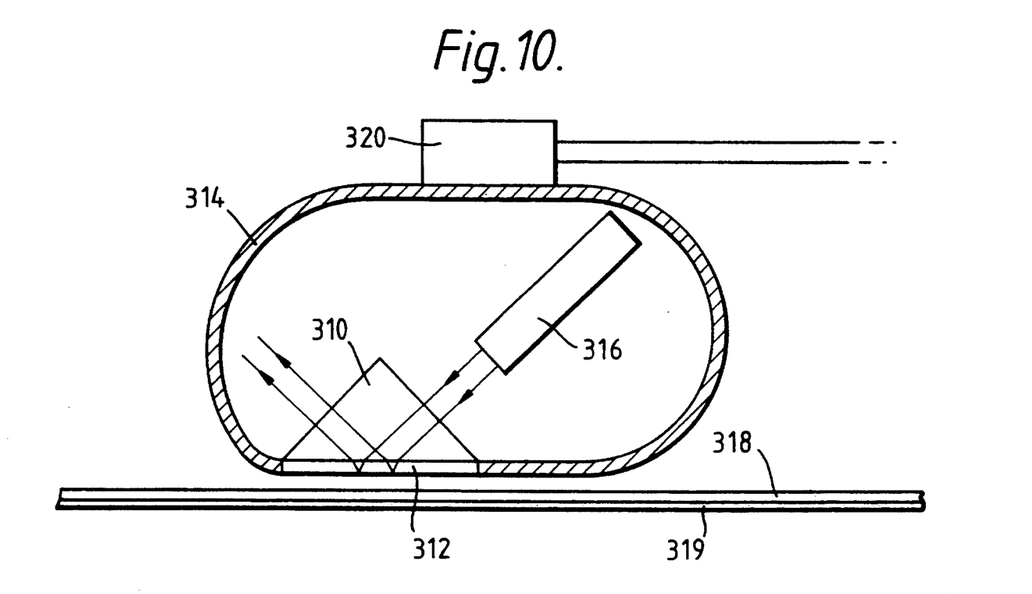
FIG. 10 is a schematic sectional side view illustrating another method which may be utilised in the production of a microlens screen.
Figure 11:
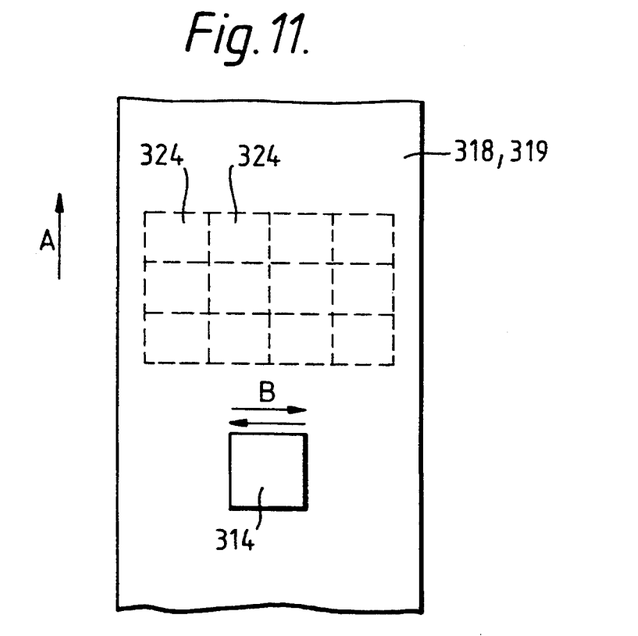
FIG. 11 is a schematic plan view illustrating another aspect of the method of FIG. 10.

FIGS. 10 and 11 relate to an embodiment of the invention according to claim 8 herein.

Referring to FIG. 10 of the accompanying drawings, the reference numeral 310 indicates the right-angled prism and the reference 312 indicates the photopolymer layer on the hypotenuse face of the prism 310, which layer 312 bears the hologram derived from the mask referred to above (i.e. the mask formed with said array of transparent "holes"). The prism 310, with layer 312 adhered thereto, is mounted in an appropriate head, indicated schematically at 314, so that the layer 312 forms the planar underface of the head 314 or part of a planar underface of the head 314. The reference numeral 316 indicates schematically a source of laser light arranged within the head 314 to direct laser light through the appropriate one of the two mutually perpendicular faces of the prism to pass, internally of the prism, to the hypotenuse face, coated with layer 312. The head 314 is mounted with its planar underface directly above and spaced only slightly from a layer 318 of a photopolymer, (or of the monomer from which the polymer will be derived by photo-polymerisation) and which layer 318 may be supported on and adhered to a transparent substrate 319, for example of a stable plastics material. The layer 318 is parallel with the underface of the head 314 and is spaced therefrom by a distance corresponding with the spacing of the original mask from the layer 312 during forming of the hologram. Accordingly, there is reproduced in the layer 318 an accurate image of the desired array of illuminated spots, in laser light from the source 316, by virtue of the hologram incorporated in the layer 312, by virtue of the hologram incorporated in the layer 312, whereby a rectangular area or block of the photopolymer layer 318 directly below and corresponding in shape and size to the hypotenuse face of the prism 310 is exposed to the desired array of light spots, whereby, because of the resulting selective polymerisation of the material of the layer 318, the desired array of graded refractive index microlenses is produced in the respective "block". The head 314 is mounted, by means indicated only schematically at 320, so that it can be traversed, in a horizontal plane, about the strips 318, 319.

By way of illustration, the substrate 319 and photopolymer layer 318 may be in the form of a continuous strip which is passed stepwise, longitudinally, in the direction of arrow A in FIG. 11 under the head 314 whilst the head 314 may be so mounted as to allow it to be moved stepwise transversely of the strip, as indicated by arrow B in FIG. 11. According, for each longitudinal position of the strip 318, 319, the head 14 may be traversed stepwise across the strip, with the underlying "block" of the photopolymer layer 318 being exposed at each step, so that, as indicated in broken lines, a row of such "blocks" 324 will be exposed during one complete traverse of the head 314. The strip 318, 319 may then be advanced by a distance corresponding to the longitudinal extent of each "block" 324 and the head 314 again traversed across the strip to expose a further row of "blocks" and so on, whereby the photopolymer layer 318 may be exposed block 324 by block 324, in a scanning mode. Thus, given a strip 318, 319, of the width envisaged for large-scale rear-projection television screens in a single exposure, the technique of the present invention allows a significant reduction in the number of discrete exposure steps required, as compared with a spot-by-spot (i.e. lens-by-lens) exposure system.

FIGS. 12 to 16 relate to an embodiment of the invention according to claim 10 herein.

It is well known that the processing of silver halide in gelatin layers can produce relief images by two main methods:

(a) the development of the layer followed by fixing—thus causing a collapse of the layer in the unexposed regions;

(b) the development of the layer followed by etch bleaching to dissolve the developed silver and the gelatin in the regions of the exposed image.

In preferred embodiments of the invention, method (b) is used to provide a surface relief pattern which can be transferred to a transparent plastics sheet to afford a desired optical microstructure.

In the following, a procedure is outlined whereby an optical microstructure, in the form of an array of spherical or quasi-spherical microlenses in a transparent plastics sheet may be produced.

This procedure utilises a high resolution photographic material (e.g. Agfa-Gavaert 8ES6HD or Millimask material) comprising a (relatively thick about 6 $\mu$m) layer of silver halide/gelatin emulsion on a supporting substrate.

Figure 12:
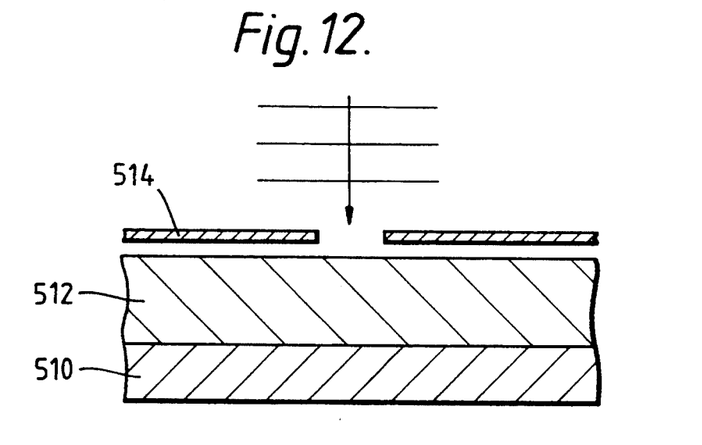
FIG. 12 is a diagrammatic sectional view showing exposure of a photographic material to an irradiance pattern through a mask.

Referring to FIG. 12, in which the supporting substrate, for example plastics film or glass, is indicated at 510 and the emulsion layer at 512, the material is first exposed to a light pattern, comprising an array of tiny circular spots (e.g. of 18 m diameter) by contact printing with a mask 514.

The contact lithographic method illustrated in FIG. 12 is best performed using a chromium mask 514 created by a direct recording of the initial pattern of microscopic circular dots into a resist layer on a thin layer of metallic chromium on a transparent substrate followed by etching of the chromium to form microscopic holes or "windows". Such a chromium mask is durable and is cable of very high edge definition with respect to the microscopic holes or "windows".

Figure 13:
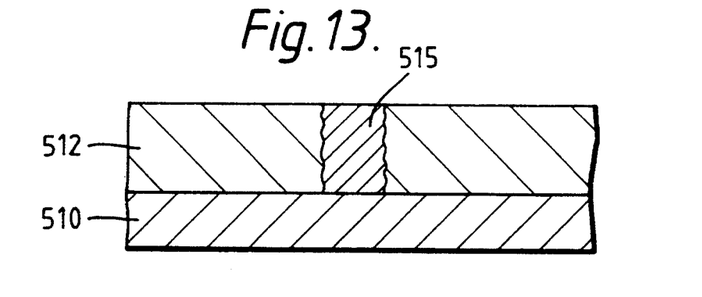
FIG. 13 is a diagrammatic sectional view illustrating the condition of the material after development.

The exposed photographic material is then developed in developer that affords good depth development of the silver image. FIG. 13 illustrates the material at the end of this stage, the reference 515 indicating a clump of silver grains representing the image of one of the apertures or "windows" in the mask 514.

Figure 14:
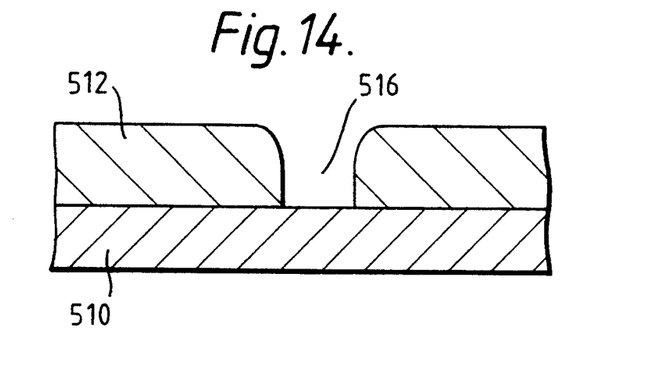
FIG. 14 is a diagrammatic sectional view illustrating the material of FIGS. 11 and 12 after a further, etching step.

The developed material is then etch bleached to produce etch pits 516 in the gelatin layer, in the regions previously occupied by the spots of silver grains, as illustrated in FIG. 14. The etch bleaching may be carried out using a silver solvent solution such as acidified copper sulphate with the addition of potassium bromide and hydrogen peroxide. As a result of the use of the chromium mask with its array of defect-free holes with exceptional edge definition, the etched pits 516 at the end of this etching stage are unusually clean and are devoid of taper problems.

Figure 15:
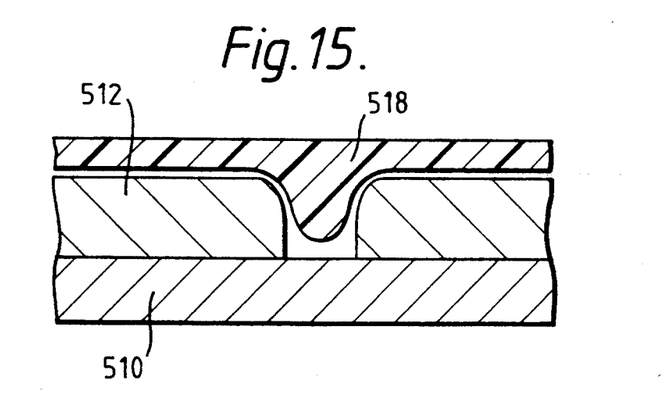
FIG. 15 is a view similar to FIGS. 12 to 14 but illustrating the deformation of a deformable plastics material into the relief pattern resulting from the etching step.

As illustrated in FIG. 15, a deformable plastics intermediate material 518 is then applied to the relief surface using heat and or pressure.

The deformed plastics layer 518 is then stripped from the gelatin layer, the plastics layer thus affording an array of protuberances corresponding to the array of etch pits in the gelatin layer. The plastics layer may, at this stage, be briefly raised to its softening temperature so that the surfaces of the protuberances are "rounded off" by the inherent surface tension of the material whereby each protuberance adopts a part-spherical form.

Figure 16:
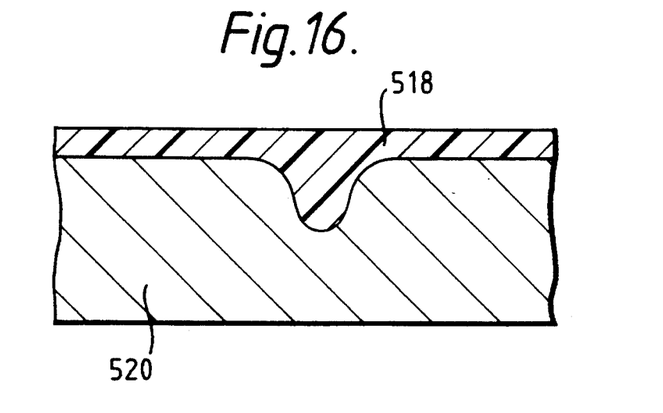
FIG. 16 is a diagrammatic sectional view illustrating the formation, by an electrotyping or electroforming technique, of an embossing tool surface, by derivation from the deformed surface of the plastics material resulting from the step illustrated in FIG. 15.

After cooling the plastics material the deformed surface is used as a "master" for an electroforming or electrotyping step, illustrated in FIG. 16, in which a layer of nickel 520 is formed in intimate contact with the surface of the plastics material 518 bearing said array of protuberances, the nickel layer 520 thus having a surface exactly complementary with that of the plastics layer and thus being formed with an array of concave pits. This surface of the nickel layer 520 is used as the embossing surface of a durable embossing tool. By way of example, the nickel layer 520, once the plastics layer has been stripped therefrom, may be bonded to the surface of a metal roller, to form an embossing roll, whereby transparent plastics sheet material may be embossed, to form an array of spherical microlenses thereon, by passing the plastics sheet in continuous strip form, in a heated and softened condition, between such embossing roller and a counter-roller.

It will be appreciated that by utilising a mask 514 with the appropriate "image" for the contact printing phase, optical microstructures of other forms besides arrays of spherical lenses may be formed. For example, a series of parallel cylindrical lenses could be similarly formed, or, conceivably, structures such as Fresnel lenses or prisms. Similarly, by arranging for the final product to be reflective rather than transparent, for example by metallisation of the product, corresponding reflective optical microstructures could be produced, such as arrays of micro-mirrors.

Furthermore such a method could be applied to the formation of pitted surfaces of predetermined form for compact disc applications, for example.

In a further variant, the plastics material to which the desired relief pattern is imparted may be a photopolymerisable substance which is subsequently selectively exposed to polymerising radiation (e.g. to ultra-violet light) in the region of each protuberance to bring about selective polymerisation with an associated refractive index variation, thereby adding a graded refractive index (GRIN) lens effect to each microlens.

The method described above may utilise any of a number of commercially available high-resolution photolithographic emulsions, having emulsion thicknesses typically in the region 6 μm–17 μm. Generally it is preferred to have microlenses with a diameter of around 3 times the lens thickness, possibly rather more, giving, for the above thickness range, a preferred microlens diameter range of 18 μm to 51 μm. The method may, of course, utilise emulsions of greater or lesser thickness with correspondingly greater or lesser preferred microlens diameter.

The developing and etching treatment of conventional photographic emulsions utilised in the above-described method in accordance with the invention may also be used to achieve many effects, particularly on a microscopic scale which have previously been associated with the use of conventional photo-resists, with the advantage of much improved (photographic) speeds.

Figure 17:
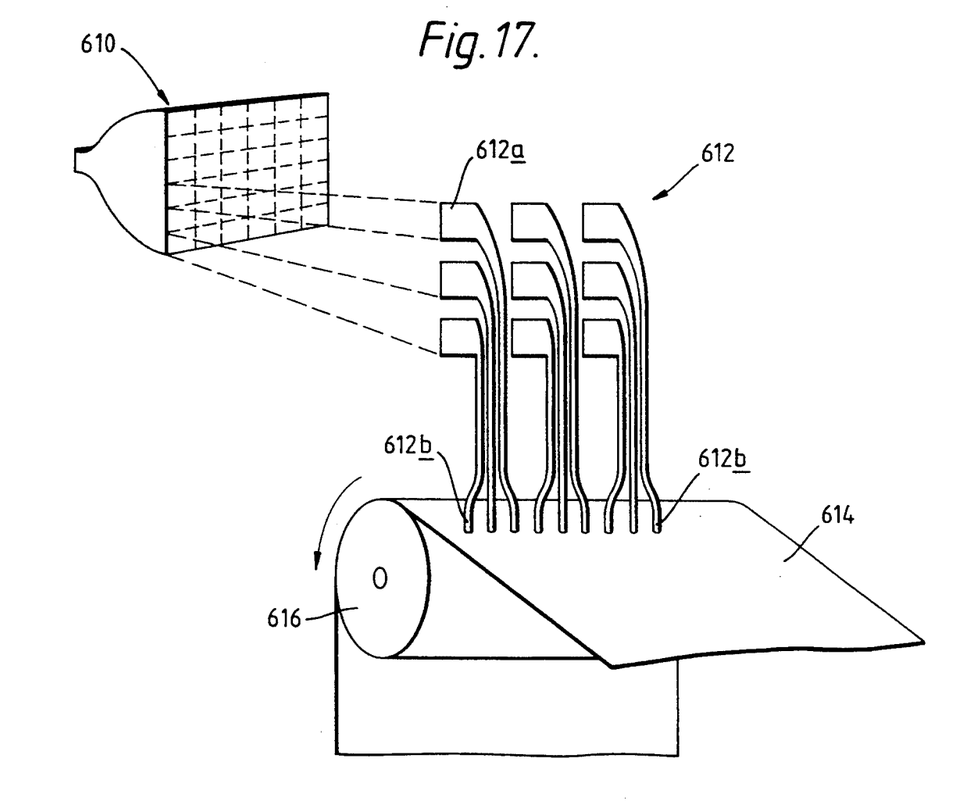
FIG. 17 is a diagrammatic exploded perspective view illustrating the operating principle of the invention.
Figure 18:
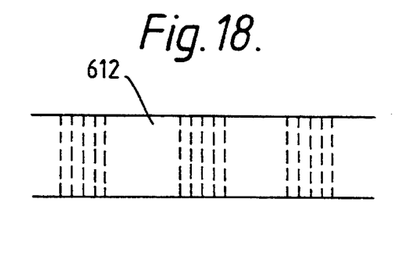
FIG. 18 is a diagrammatic cross-sectional view illustrating the arrangement of light guides within a variable refractive index sheet utilised in carrying out the invention.
Figure 19:
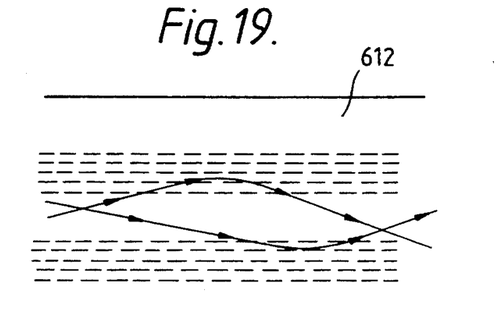
FIG. 19 is a diagrammatic plan view corresponding to FIG. 18.

FIGS. 17 to 19 relate to an embodiment of the invention according to claim 11 herein.

Referring to FIG. 17, a computer-controlled VDU has a cathode-ray tube affording a screen 610. The screen 610 is notionally divided into a grid of rows and columns of individual areas or "pixels", for example 200 rows of 200 columns although, for the purposes of illustration, far fewer are shown in FIG. 17. Applied to the face of the screen 610 is a system of light guides, indicated schematically at 612 in FIG. 17, (and illustrated in FIG. 17, for the purposes of illustration only, as being substantially spaced from the screen 610). Each of the light guides 612 is assigned to a particular one of the pixels on the screen 610 and has an entrance end 612a which ideally extends over the whole of the respective pixel on the screen 610 and an exit end 612b which terminates at the surface of a photosensitive sheet 614. The light guides 612 may, in principle, be individually formed, for example from bundles of glass fibres, flexible plastic elements or the like, but in the preferred embodiment, the light guides 612 are formed in a unitary sheet of variable refractive index polymeric material by appropriate systems of refractive index variations in the sheet.

The exit end 612b of each light guide 612 is of very small cross-sectional area, for the size of such exit end determines the resolution which the printing system is capable of producing. Although in FIG. 17, for the purposes of illustration, the ends 612b are illustrated as being spaced apart transversely, the exit ends 612b are actually packed as close together as possible in a single row extending width-wise across the photosensitive sheet 614.

The sheet 614 may be in the form of a continuous strip driven by a driving mechanism (not shown) and guided by appropriate rollers 616 for longitudinal advance through the exposure zone in which is located the row of exit ends 612b of the light guides 612. The mechanism for advancing the strip 614 is also controlled by the computer controlling the illumination of the individual pixels of the screen 610 so that, for example, for every field scan of the cathode-ray tube the strip 614 is advanced by an amount corresponding to the dimension of each exit end 612b. During each field scan, the computer determines, for each pixel, whether that pixel is to be illuminated or not and controls the "display" on the screen 610 accordingly. As a result, the surface of the strip 614 is exposed or unexposed on a dot-by-dot basis in a grid of rows and columns of such dots, to produce a desired image on the strip 614. The apparatus may thus, for example, print lines of text, with each character being produced on a dot-matrix system, so that if, for example, an 8×8 matrix is used, eight advancement steps of the strip 614 will be required for each line of text and so on. It will be appreciated that the screen 610 is used purely as a mechanism for applying individual pulses of light to the respective light guides and that, accordingly, the image printed on the sheet 614 is not, in any normal sense, the same as the "image" appearing on the screen 610. Because the cathode ray tube follows a predefined scan and the light guides 612 are in a predetermined arrangement, it is possible to take advantage of the fact that the illumination to be applied in any one cycle to the entrance end of any light guide (assuming that that light guide is to be illuminated in the cycle) takes a very short time (corresponding to the time taken by the cathode-ray tube to scan the lines upon which the entrance end of the respective light guide 612 is superimposed) by displacing the exit ends 612b of the respective guides relative to each other, in the conveying direction of the strip 614, according to the sequence in which the light guides 612 are illuminated in the course of a scan, to minimise or even eliminate the period between successive advance steps of the strip 614 for which the strip must remain stationary. It will be appreciated that, if the light guides 612 are appropriately arranged, such displacement of the outlet ends 612b in the direction of conveyance of the strip 614 may be effected simply by inclining the row of exit ends 612b slightly relative to the perpendicular to the conveying direction.

The photosensitive strip 614 may comprise a conventional photographic material which is appropriately processed after passing through the exposure zone or may comprise any of a number of suitable substitutes for conventional photographic materials, and may be a monochrome or colour printing material. It will be appreciated that instead of a strip of sheet material, a photosensitive drum of an electrostatic-type photocopier may be arranged to rotate past the outlet ends of the light guides 612 with a corresponding visible image being printed upon sheets of paper in the manner known from such photocopiers. Various other alternatives will be evident to those skilled in the art.

As indicated above, the light guides 612 are preferably formed in an integral sheet of variable refractive index material, such as a photopolymer, by appropriate localised variations in the refractive index in the sheet. It is a relatively straightforward matter to produce, in such a sheet, a system of parallel light guides extending to one edge of the sheet, by exposure of such a sheet of photopolymer (or rather of the corresponding monomer) to a pattern of light comprising a corresponding system of bands of light with interposed bands of darkness. In such a system of light guides, light can be guided down each of the relatively high refractive index strips by total internal reflection or analogous refraction at or in the boundary regions with the relatively low refractive index zones on either side and is correspondingly internally reflected at the photopolymer/air surfaces of the sheet.

In FIGS. 18 and 19, the dotted regions represent the regions of lower refractive index in the photopolymeric sheet, and which act as the individual light guides 612. FIG. 19 illustrates schematically how refraction at the boundaries with the regions of lower refractive index acts to contain light beams within the higher refractive index regions. The solid lines in FIG. 18 represent the upper and lower surfaces of the sheet where total internal reflection occurs to return to the guides 612 light rays proceeding at an angle to such surfaces.

More complex techniques may be required to guide the light emerging from the individual pixels of the screen 610, principally at right angles to the surface of the screen and thus the surface of the photopolymer sheet applied thereto, into a direction or directions parallel with the surface of the sheet and along the portions of the light guide running parallel with such surfaces. Thus, for example, it may be necessary to resort to some form of "etching" or "diffusion" technique to produce a variation of refractive index with depth in the portion of the photopolymer sheet applied to the screen 610, or to emboss or otherwise form one or both surfaces of the sheet in the area applied to the screen 610 to achieve the desired effect. It will be appreciated that the problem of leading the remaining portions of the light guides 12 past or between the inlet ends applied to the individual pixels on the screen 610 is similar to that arising in disposing the various electrical conductors around and connected with individual segments of multi-segment or multi-pixel LCD displays, for example, and is similarly soluble. It will be appreciated that, if necessary, a separately formed optical system may be provided, attached to the screen 610, for collecting light from the individual pixels of the screen 610 and delivering such light at respective outlets in a row of outlets to which can be applied one edge of a photopolymer sheet having light guides extending longitudinally in the sheet, parallel with the surfaces thereof, from the last-mentioned edge to the edge which is positioned adjacent the photosensitive material 614, such light guides being formed by variations of the refractive index transversely of the sheet as discussed above, whereby the photopolymer sheet merely functions as the optical equivalent of a flat-ribbon conductor in electronics applications.

It will be appreciated that since all of the pixels on the screen 610 are effectively mapped into one row of pixels of the image formed on the photosensitive material 614, a relatively coarse pixel resolution on the screen 610 is adequate to provide a very fine resolution in the "printed" image on the medium 614 or in the visual image derived therefrom. Thus, for example, with an array of 200 rows by 200 columns of pixels on the screen 610 (i.e. a total of 40,000 pixels) the corresponding image on the strip 614 will comprise 40,000 dots from edge to edge.

A microlens screen as described above, or as described in GB2206979A, may be used, in conjunction with an LCD pixelated screen used as a built-in monitor or "viewfinder" in a television camera or "camcorder" in place of the more conventional miniature crt. In such an application, the microlens screen will not normally serve as a projection screen to receive an optically projected image of the picture on the LCD screen but serves rather as a type of "Fourier filter" to depixelate the LCD screen, (i.e. to render the boundaries of the pixels, or the transitions from pixel to pixel, invisible to the eye). In an arrangement of this sort it is preferable to fill the space between the microlens screen and the LCD screen by a colourless clear liquid of a refractive index approximating that of the microlens screen and the boundary plates of the LCD screen, for example a liquid such as glycerine. This expedient has been found to eliminate certain unwanted interference effects such as fringing or "Newtons" rings.

We claim:

1. A sheet of transparent material comprising a layer of a photopolymer which has been formed with an array of integral graded refractive index microlenses by selective exposure of a photopolymerisable monomer to polymerising radiation wherein each microlens terminates, on at least one of the surfaces of the sheet, in a surface relief formation which adds to the power of the respective microlens.

2. A method of making a light diffusing material comprising providing a sheet of light-transmitting base material, having a surface thereof configured to form an array of microlenses, coating the base material with a layer of a medium, said medium being a photopolymerisable monomer, of which the refractive index can be varied by exposure to light, then exposing the variable refractive index medium to light through the said base material having said microlenses formed thereon, whereby the localised variation in intensity of said light, through the variable refractive index medium, produced by said microlenses, causes corresponding variations in refractive index in said medium whereby there is produced, in said medium, an array of graded refractive index lenses each aligned with, and adding its optical effect to, a respective said microlens of the base material.

3. A method of making a light diffusing material comprising forming a sheet or layer of a medium, said medium being a photopolymerisable monomer, of which the refractive index can be varied by exposure to light, one surface of said sheet or layer being moulded or embossed to afford form an array of microlenses, exposing the sheet or layer of said medium to light through said moulded or embossed surface, whereby the localised variation in said light, through the variable refractive index medium, produced by refraction at said moulded or embossed surface, causes corresponding variations in refractive index in said medium, whereby there is produced, in said medium, an array of graded refractive index lenses each aligned with, and adding its optical effect to, a respective microlens surface defined by said moulding or embossing.

4. A method of making a light diffusing material comprising forming a sheet or layer of a medium, said medium being a photopolymerisable monomer of which the refractive index can be varied by exposure to light, exposing the sheet or layer of said medium to light through an optical mask consisting of an array of light transmitting areas in an opaque field whereby the localised variation in said light, through the variable refractive index medium, produced by said mask causes corresponding selective polymerisation of said medium in said light transmitting areas with corresponding variations in refractive index in said medium, whereby there is produced, in said medium, an array of graded refractive index lenses, the method including leaving at least one surface of said sheet or layer free during exposure and photopolymerisation, whereby said sheet or layer undergoes a surface modification associated with said selective polymerisation to produce an array of microlenses defined by the surface contour of said surface, each of said microlenses defined by said surface contour being aligned with, and adding its optical effect to, a respective said graded refractive index lens.

* * * * *

UNITED STATES PATENT AND TRADEMARK OFFICE
CERTIFICATE OF CORRECTION

PATENT NO. : 5,442,482
DATED : August 15, 1995
INVENTOR(S) : William N. H. Johnson and
Nicholas J. Phillips It is certified that error appears in the above-indentified patent and that said Letters Patent is hereby corrected as shown below:

Column 4 Line 61 "inventor" should read --inventors--.

Column 5 Line 19 "In" should read --in--.

Column 11 Line 55 "necessary" should read --necessity--.

Column 14 Lines 61-62 delete "by virtue of the hologram incorporated in the layer 312,".

Column 15 Line 11 "According," should read --Accordingly,--.

Column 15 Line 12 "head 14" should read --head 314--.

Column 16 Line 20 "and or" should read --and/or--.

Claim 3 Column 20 Line 35 "afford form" should read --form--.

Signed and Sealed this

Fifth Day of December, 1995

Attest:

*Attesting Officer*

BRUCE LEHMAN

*Commissioner of Patents and Trademarks*